United States Patent [19]

Ballatore et al.

[11] Patent Number: 4,752,872
[45] Date of Patent: Jun. 21, 1988

[54] ARBITRATION DEVICE FOR LATCHING ONLY THE HIGHEST PRIORITY REQUEST WHEN THE COMMON RESOURCE IS BUSY

[75] Inventors: Daniel Ballatore, Bar Sur Loup; Simon Huon, Roquefort Les Pins; Jean-Marie Munier, Cagnes Sur Mer, all of France

[73] Assignee: International Business Machines Corporation, Armonk, N.Y.

[21] Appl. No.: 745,549

[22] Filed: Jun. 17, 1985

[30] Foreign Application Priority Data

Jun. 28, 1984 [EP] European Pat. Off. ............ 84430024

[51] Int. Cl.⁴ ............................................. G06F 13/18
[52] U.S. Cl. ..................................................... 364/200
[58] Field of Search ........................ 340/825.5, 825.51; 370/85, 94; 364/200 MS File, 900 MS File

[56] References Cited

U.S. PATENT DOCUMENTS

| | | | |
|---|---|---|---|
| 4,096,569 | 6/1978 | Barlow | 364/200 |
| 4,096,571 | 6/1978 | Vander May | 364/200 |
| 4,121,285 | 10/1978 | Chen | 364/200 |
| 4,189,766 | 2/1980 | Horiguchi et al. | 364/200 |
| 4,229,791 | 10/1980 | Levy et al. | 364/200 |
| 4,237,534 | 12/1980 | Felix | 364/200 |
| 4,257,095 | 3/1981 | Nadir | 364/200 |
| 4,281,381 | 7/1981 | Ahuja et al. | 364/200 |
| 4,375,639 | 3/1983 | Johnson | 364/200 X |
| 4,433,375 | 2/1984 | Vinot | 364/200 |

Primary Examiner—Raulfe B. Zache
Assistant Examiner—Florin Munteanu
Attorney, Agent, or Firm—John B. Frisone

[57] ABSTRACT

An arbitration device for enabling a common resource to be shared by a plurality of processors, all connected by a common bus and each processor having a certain access priority. When more than one processor requests access to the resource, the highest priority processor request signal is latched and access is granted while the other requesting processor's latches remain set (access not granted). If two processors request access while the resource is busy, then only the latch of the processor having the highest priority of the two will be reset when the bus becomes available, and that processor will gain access.

3 Claims, 2 Drawing Sheets

ARBITRATION DEVICE FOR LATCHING ONLY THE HIGHEST PRIORITY REQUEST WHEN THE COMMON RESOURCE IS BUSY

TECHNICAL FIELD

This invention relates to data communication systems and, more particularly, to an arbitration device for resolving competing requests for access to a resource shared by a plurality of processors.

BACKGROUND ART

The ever-increasing use of microprocessors has led to the development of a new data processing system architecture that allows a plurality of microprocessors to communicate with one another at high speed through a shared storage. This involves the use of a common bus over which the microprocessors and the storage can exchange data, addresses and various control signals. Since the common bus can only be used by one microprocessor at a time, it is essential that such data processing systems be provided with suitable means for controlling access to the common bus by the microprocessors so as to prevent simultaneous accesses as these would result in errors. A great many arbitration devices for resolving competing requests for access to a shared resource exist in the prior art, and it would be tedious to enumerate them here.

A disadvantage of some of these prior art devices in that, in many cases, they are designed to meet the requirements of specific processors or resources and are consequently difficult to use with other processors or resources.

A drawback to other prior art arbitration devices is that they are intended to resolve contentions likely to arise in connection with most applications and in most foreseeable situations and are, as a result, somewhat complex. While this complexity may be justified in the case of particularly involved applications, its effect is to reduce the speed of the devices and to make them poorly suited to the requirements of less intricate applications in which priorities among the processors may be unnecessary or, if needed at all, can be quite simple.

SUMMARY OF THE INVENTION

It is the object of this invention to overcome these difficulties by providing a very simple arbitration device for resolving competing requests for access to a shared resource, with or without the use of simple priorities among the processors sharing said resource.

The foregoing and other objects, features and advantages of the invention will be apparent from the following more particular description of the preferred embodiments of the invention as illustrated in the drawings.

The arbitration device of the present invention controls access to a resource shared among N processors connected thereto by a common bus, each processor has an input for receiving a control signal for granting access to the shared resource and an output for providing a signal for requesting access to the shared resource, and is characterized in that it comprises:

N NAND gates respectively associated with the N processors, each of said gates has its output connected to the input of the associated processor and has its inputs connected to the output of said associated processor and to the outputs of the other gates, so that when a processor requests access to the shared resource, that processor causes the signal on its output to go to a first predetermined level and will only be given access to said shared resource if, in response to its request, a signal at a second predetermined level is applied to its input.

In accordance with another aspect of the invention, the arbitration device for controlling access to a resource shared among N processors connected thereto by a common bus, each processor including an input for receiving a control signal for granting access to the common bus input and an output for providing a signal for requesting access to the said common bus, is characterized in that it comprises:

N first NAND gates respectively associated with said N processors,

N latches respectively associated with said N first gate, each of said first gates having its output connected to a first input of the associated latch, and its inputs connected to the output of said associated processor and to the outputs of the other latches not associated therewith, and second gates for applying to the second input of each of said latches the signal obtained on the controllable outputs of the processors having a higher priority than the processor associated with that latch, so that, when a processor requests access to said shared resource, that processor causes the signal on its output to go to a first predetermined level and will only be given access to said resource if, in response to its request, a signal at a second predetermined level is applied to its input, and that, when at least two processors having different priorities are requesting access to the shared resource while the resource is busy, only the output from the latch associated with the requesting processor that has the highest priority will go to said second predetermined level when the resource becomes available, thereby giving that processor access thereto.

DETAILED DESCRIPTION OF THE INVENTION

Figure 1:
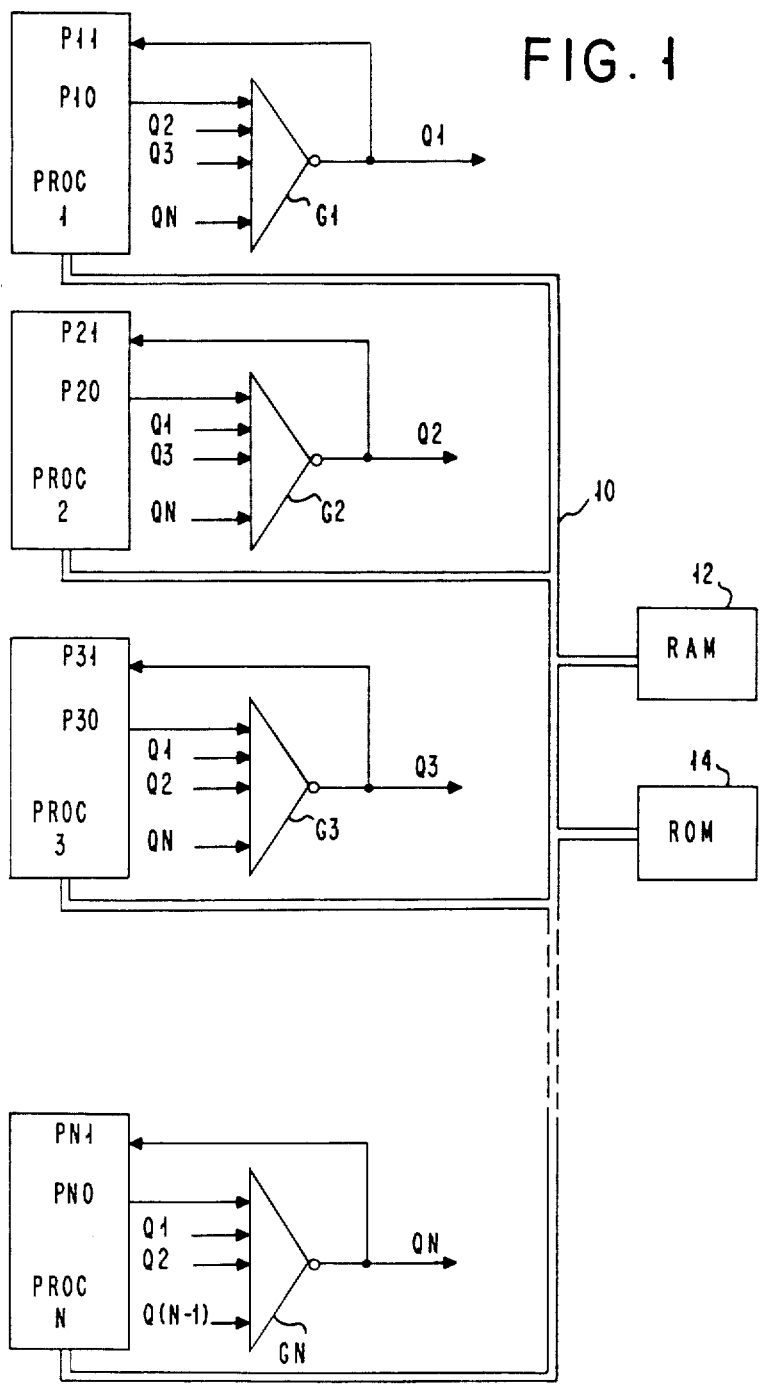
FIG. 1 is a block diagram of an exemplary embodiment of an arbitration device in accordance with the invention.

Referring to FIG. 1, a multi-processor system incorporating the arbitration device of the present invention is shown. Four of these processors, PROC 1, PROC 2, PROC 3 and PROC N, are illustrated. The outputs of these processors are connected to one another and to a common bus 10, which is also connected to various resources, shown as a random-access memory (RAM) 12 and a read-only memory (ROM) 14, shared among the processors. Conventionally, each processor PROC 1-PROC N is provided with several program-controlled inputs and outputs. For simplicity, each processor is shown in FIG. 1 as including a single input and a single output the use of which is specific to the invention.

In processors PROC 1, PROC 2, PROC 3 and PROC N, these inputs are designated P11, P21, P31 and PN1 while the outputs are designated P10, P20, P30 and PNO, respectively. The N processors, PROC 1, PROC 2, PROC 3, . . . PROC N−1, PROC N, are respectively associated with N NAND gates, G1, G2, G3, . . .

G(N−1), GN, provided with N inputs. These NAND gates generate signals Q1, Q2, Q3, ... Q(N−1), QN, respectively. The signal appearing at output P10 is applied to NAND gate G1 together with output signals Q2, Q3, ... QN; the signal at output P20 is applied to NAND gate G2, together with output signals Q1, Q3,... QN; the signal at output P30 is applied to NAND gate G3, together with output signals Q1, Q2, Q4, ... QN, and so forth, with the signal at output PN0 being applied to NAND gate GN along with signals Q1, Q2, ... Q(N−1). Signals Q1, Q2, Q3, ... are respectively applied to inputs P11, P21, P31, ... PN1.

In operation, when common bus 10 is free, all output signals at P10, P20, ... PN are low and, consequently, all signals Q1, Q2, ... QN, are high. When a processor, such as PROC 1, desires to request access to bus 10, it causes its output signal at P10 to go high. This, in turn, causes signal Q1 to go low and signals Q2–QN to go high. Processor PROC 1 then determines the level of signal Q1 applied to its input P11. Signal Q1 is low, which means that PROC 1 can access common bus 10.

If another processor, say, PROC 2, desires to access bus 10 while processor PROC 1 is accessing the bus, PROC 2 requests access thereto by causing the signal at its output P20 to go high, and then determines the level of the signal applied to its input P21. Since signal Q1 is low because PROC 1 was given access to bus 10, the high signal at output P20 has no effect on output signal Q2 from NAND gate G2, and that signal Q2 remains high. Since the signal applied to its input P21 is high, PROC 2 is prevented from accessing common bus 10.

When processor PROC 1 releases its control of common bus 10, it causes the signal at output P10 to go low, and signal Q1 goes high. At this time, all signals Q1–QN are high, indicating that bus 10 is free. Thereafter, the first request for access to bus 10 will be granted as described above.

If several processors are simultaneously requesting access to the bus when it becomes available, then one of the output signals from the NAND gates associated with such processors will go low first, in a random manner, thereby granting the associated processor's request and preventing all other processors from accessing bus 10.

Figure 2:
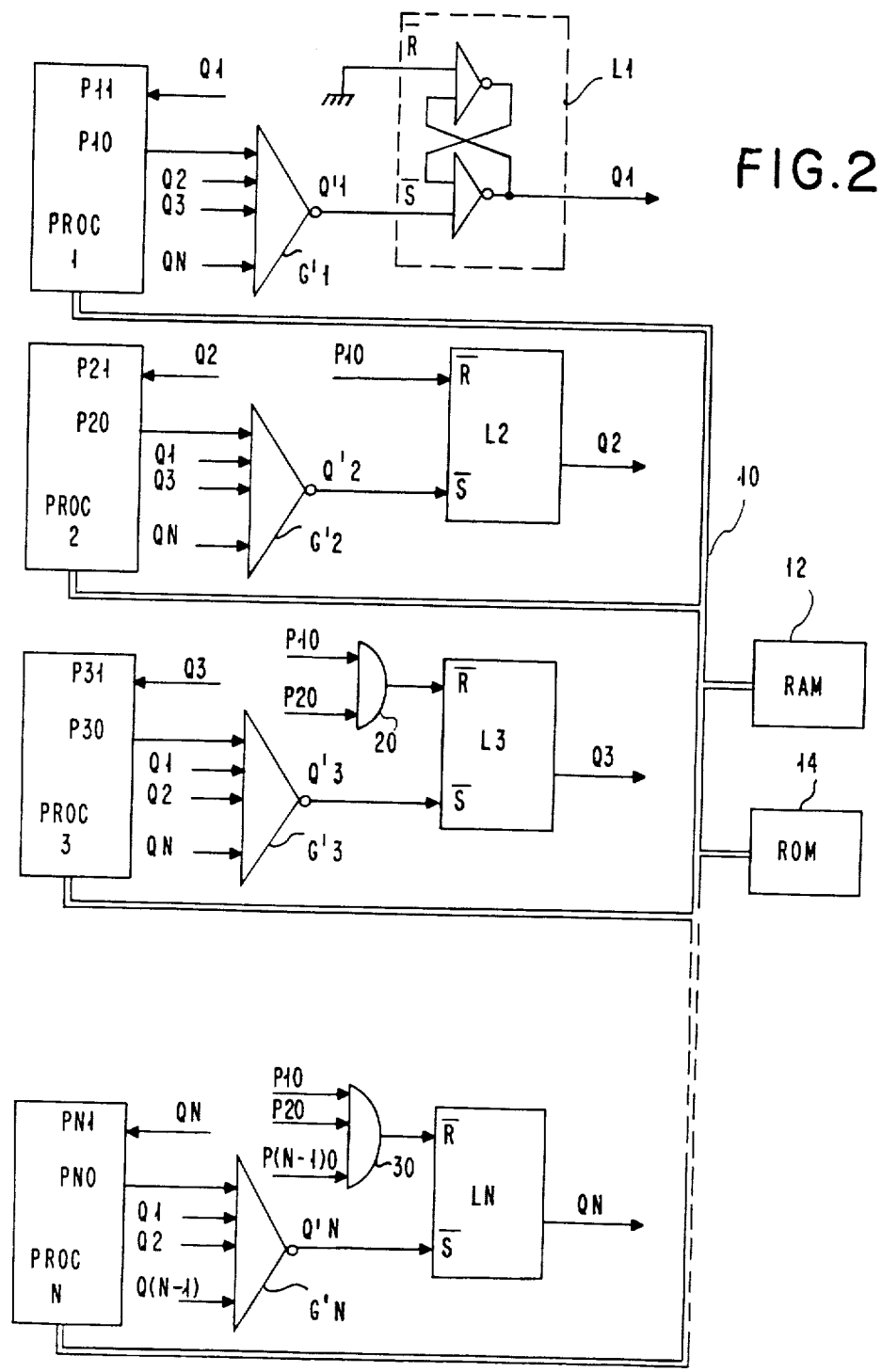
FIG. 2 is a block diagram of an exemplary embodiment of an arbitration device that uses priorities established in accordance with the invention.

Referring now to FIG. 2, there is shown an improved embodiment of the device of FIG. 1 which enables the arbitration device to control access to the common bus by establishing priorities among the processors. The same reference numerals are used to designate elements common to FIGS. 1 and 2. Processors PROC 1, PROC 2, PROC 3, ... PROC N−1, PROC N are respectively associated with N AND gates, G′1, G′2, G′3, ... G′(N−1), G′N, provided with N inputs and whose outputs are respectively connected to input S of each of N RS-type latches, L1–LN. Said N gates generate N intermediate signals designated Q1′, Q2′, Q3′, ..., Q(N−1)′, Qn′, respectively. Latches L1–Ln provide signals Q1–QN, respectively. The signal at output P10 is applied together with signals Q2, Q3, ... QN to AND gate G′1; the signal at output P20 is applied together with signals Q1, Q3, ... QN to AND gate G′2; the signal at output P30 is applied together with signals Q1, Q2,. Q4, ... QN to AND gate G′3, and so on, with the signal at PN0 being applied together with signals Q1, Q2, ..., Q(N−1) to AND gate G′N. Signals Q1, Q2, Q3, ... QN are respectively applied to inputs P11, P21, P31, ..., PN1. In the exemplary embodiment shown in FIG. 2, each of latches L1–LN is conventionally comprised of two cross-coupled NAND gates, and it has been assumed that processors PROC 1 to PROC N had decreasing priorities. The signal at input $\overline{R}$ of the latch associated with the processor having the highest priority, that is, in this example, latch L1, is maintained at a low level as by connecting it to ground. Input $\overline{R}$ of the latch associated with the processor having the next priority level, that is, latch L2, is connected to output P10. Input $\overline{R}$ of latch L3 is connected to the output of an OR gate 20 whose inputs are connected to the outputs of the processors having a higher priority than the associated processor, that is, outputs P10 and P20. Input $\overline{R}$ of latch LN is connected to the output of an OR gate 30 whose inputs are connected to outputs P10, P20, ... P(N−1).

In operation, when common bus 10 is available, the signal on all outputs P10, P20, ... PN are low and, therefore, all signals Q1′, Q2′, ... QN′are low and all signals Q1, Q2, Q3, ... Q(N−1), QN are high. When a processor such as PROC 1 desires to access bus 10, it causes the signal on output P10 to go high, thereby causing signal Q1′ to go high and signal Q1 to go low. PROC 1 then determines the level of the signal applied to its input P11. Since that signal, Q1, is low, the processor can gain access to the bus. Because Q1 is low, signals Q2′, Q3′, ... QN′ are low and signals Q2, Q3, ... QN are high, thereby preventing the other processors from accessing common bus 10.

If a similar request is made by two other processors, for example PROC 2 and PROC 3, while PROC 1 is accessing bus 10, then both processors will cause the signals on outputs P20 and P30 to go high and, when the bus becomes available, the processor having the highest priority, that is, PROC 2, will gain access to the bus, as explained below.

Processor PROC 1 releases its control of the bus by causing the signal on output P10 to go low. This low output signal is directly applied to input $\overline{R}$ of latch L2, thereby resetting L2 and causing its output signal Q2 to go low. This low signal is applied to input P21 of processor PROC 2, which is thereby informed that it can access bus 10. The low signal on output P10 has no effect upon input $\overline{R}$ of latch L3 as this input is maintained at a high level by the high signal present on output P20 of PROC 2, which has a higher priority than processor PROC 3.

The device of FIG. 2 enables the same priority to be assigned to several processors. For example, if it were desired to assign the same priority to processors PROC 2 and 3, all that would be required to do so would be to eliminate the connection between output P20 of PROC 2 and input $\overline{R}$ of latch L3, that is, to eliminate OR gate 20 and connect output P10 directly to input $\overline{R}$ of latch L3, in which case inputs $\overline{R}$ of latches L2 and L3 would be controlled in parallel and in an identical manner. If simultaneous requests for access to the common bus are made by two processors that have the same priority, then control of the bus is randomly given to one of the requesting processors, as in the device of FIG. 1.

We claim:

1. An arbitration device for controlling access on a priority basis to a resource shared among N processors connected to the resource by a common bus, each processor including an input for receiving a control signal for inhibiting access in a first state and granting access in a second state to the common bus and an output for selectively providing a signal in the said first state for requesting access to the common bus, said arbitration device comprising:

- N first means each respectively associated with one of said N processors, each of said first means having N inputs and one output which provides an output signal in the said first state when all of the N inputs are in the said first state and an output signal in the said second state at all other conditions of the N inputs;
- N latches each respectively associated with one of said N first means, each of said latches having a first and second input and an output which provides an output signal in the said first state when the said first latch input is in the said first state and an output which is controlled by the state of the said second latch input when the said first latch input is in the said second state;
- N second means for connecting the output of each said latch to the said input of its associated processor;
- each of said N input first means having its said output connected to the said second input of its associated latch and one of its N inputs connected to the output of its said associated processor and its other N−1 inputs respectively to the outputs of the other of said N−1 latches not associated therewith; and
- third means for interconnecting the first input of each of said N latches to the outputs of those processors having a priority higher than the priority of the processor associated with that latch whereby when a processor requests access to said shared resource, that processor causes the signal on its output to go to the said first stage and will only be given access to said resource if, in response to its request, a signal from the output of its associated latches in the said second state is applied to its input, and when two or more processors having different priorities request access to the shared resource while the resource is busy, indicated whenever the output from one of the latches is in the said second state, only the signal on the output of the latch associated with the requesting processors having the highest priority will be able to change to the said second state when the resource becomes available.

2. An arbitration device as set forth in claim 1 wherein said N first means are logical AND gates.

3. An arbitration device as set forth in any one of claims 1 or 2 wherein each said latch comprises:
- two NAND gates each having two inputs and one output; and
- means connecting the output of each NAND gate to one input of the other gate, the other inputs of the two NAND gates providing the said first and second inputs of the latch, and the output of one of the NAND gates providing the latch output.

* * * * *